United States Patent [19]

Spudich

[11] Patent Number: 5,293,108
[45] Date of Patent: Mar. 8, 1994

[54] STATIC PHASE CONVERTER

[76] Inventor: Anthony Spudich, 819 E. Central Ave., Benld, Ill. 62009

[21] Appl. No.: 740,437

[22] Filed: Aug. 5, 1991

[51] Int. Cl.$^5$ ............................................. H02P 1/26
[52] U.S. Cl. ..................... 318/749; 318/768; 363/150
[58] Field of Search ............... 318/779, 781, 794, 729, 318/747, 749, 744, 768; 363/152, 150, 136

[56] References Cited

U.S. PATENT DOCUMENTS

| | | | |
|---|---|---|---|
| Re. 30,068 | 8/1979 | Meyers | 318/762 |
| 521,051 | 6/1894 | Scott | |
| 852,027 | 4/1907 | Mershon | |
| 2,253,053 | 8/1941 | Stevens et al. | |
| 2,253,392 | 1/1940 | Oman | |
| 2,480,576 | 8/1949 | Helber | |
| 2,832,925 | 3/1955 | Koll et al. | |
| 2,968,757 | 2/1959 | Leon | |
| 3,679,960 | 7/1972 | Hirokawa et al. | 318/729 |
| 3,814,888 | 6/1974 | Bowers et al. | 363/136 |
| 4,249,237 | 2/1981 | Ronk et al. | 363/150 |
| 4,492,911 | 1/1985 | Molitor | 318/779 |
| 4,642,545 | 2/1987 | Lewus | 318/749 |
| 4,656,575 | 4/1987 | West | 363/150 |
| 4,777,421 | 10/1988 | West | 318/768 |
| 4,792,740 | 12/1988 | Smith | 318/768 |
| 4,893,479 | 1/1990 | Gillett et al. | 318/806 |

Primary Examiner—William M. Shoop, Jr.
Assistant Examiner—John W. Cabeca
Attorney, Agent, or Firm—Fitch, Even, Tabin & Flannery

[57] ABSTRACT

A relatively compact static phase converter is adapted to be disposed within the housing of an appliance, such as a refrigeration unit, making it thus suitable for residential as well as commercial applications. The static phase converter is formed as a modular unit to occupy a relatively small volume, for example, 0.5 cubic feet or less, and is adapted to be disposed adjacent the compressor compartment in a typical refrigeration unit with minimal modification. The static converter includes a balancing coil adapted to be coupled across a source of single phase electrical power, such as 120 volts AC. Two phases of a three phase electrical motor are adapted to be connected in parallel across the balancing coil. The third phase is adapted to be connected to the center phase by way of a running capacitor. Starting circuitry which includes a starting capacitor as well as a control relay is included. The relatively few number of components allows the static phase converter to occupy a relatively small volume which makes it adaptable to being disposed within the housings of various appliances including refrigeration units.

13 Claims, 3 Drawing Sheets

STATIC PHASE CONVERTER

BACKGROUND OF THE INVENTION

1. Field of the Invention

The present invention relates to a static phase converter and more particularly a static phase converter which occupies a relatively small volume to enable it to be disposed within various appliances, such as refrigeration units, with minimal modification to reduce electrical power consumption.

2. Description of the Prior Art

Static phase converters are generally known in the art. Examples of such static phase converters are disclosed in U.S. Pat. Nos. 521,051; 852,027; 2,253,053; 2,253,392; 2,480,576; 2,832,925; and 2,968,757. Such static phase converters are generally used to convert a source single phase electrical power to multiple phase, such as three phase, electrical power in various applications. One such application is to use such static phase converters to reduce the power consumption of various appliances. such as refrigerators and the like. More specifically, known refrigeration units normally include a single phase compressor motor; for example, a one-half horsepower compressor motor. A one-half horsepower single phase motor will draw approximately 7.4 amperes at 120 volts AC. A three phase one-half horsepower motor will draw approximately 4.2 amperes at 120 volts—about 40% less current than a single phase motor with the same horsepower rating. By reducing the electrical current requirements of the compressor motor, the appliance, such as the refrigeration unit, is less expensive to operate. More specifically, the cost charged by an electric utility for operating an electrical appliance is in terms of kilowatt hours (KWH). The KWH is a product of the electrical voltage and the electrical current multiplied by the period of use. For a relatively constant voltage, reducing the electrical current requirement by approximately 40% will, in turn, reduce the KWH by approximately the same amount.

Such a reduction in the KWH can result in significant savings to consumers as well as considerable conservation of precious fossil fuel resources. For example, as mentioned above a refrigeration unit with a single phase one-half horsepower compressor motor draws 7.4 amperes at 120 volts or approximately 888 watts. Assuming a typical refrigeration unit would operate approximately twelve hours per day, this yields 10.66 KWH per unit, per day per unit for operation. Multiplying this value by 365 days per year and by the approximately 72 million units in use in the United States today yields over 280 billion kilowatt hours per year for operation of the 72 million refrigeration units. If the single phase compressor motor in each of these refrigeration units was replaced with a three phase compressor motor having the same horsepower value, over 106 billion kilowatt hours would be saved per year, thus conserving precious fossil fuel resources as well as providing considerable savings to the consumers.

The problem with known static converters, such as those disclosed in the above-mentioned U.S. patents, is that they are relatively too large to be disposed within appliance and therefore are generally used infrequently with appliances and generally only in commercial applications. In such applications of the above-mentioned static phase converters, the units are mounted exterior to the appliance housing. In addition to requiring more space for the appliance, such an application results in increased cost to the consumer due to the interconnection wiring required between the appliance and the static phase converter on site. Moreover, exterior mounting of the static phase converter relative to the appliance is unsuitable in residential applications.

SUMMARY OF THE INVENTION

It is an object of the present invention to solve the problems associated with the prior art.

It is another object of the present invention to reduce the electrical power consumption of various types of appliances, such as refrigeration units.

It is another object of the present invention to provide a relatively compact static phase converter which can be disposed within a conventional appliance, such as a refrigeration unit, with minimal modification.

Briefly, the present invention relates to a relatively compact static phase converter adapted to be disposed within the housing of an appliance, such as a refrigeration unit, making it thus suitable for commercial as well as residential applications. The static phase converter is formed as a modular unit to occupy a relatively small volume, for example, 0.5 cubic feet or less, and is adapted to be disposed adjacent the compressor compartment in a typical refrigeration unit with minimal modification. The static converter includes a balancing coil adapted to be coupled across a source of single phase electrical power, such as 120 volts AC. Two phase conductors of a three phase electrical motor are adapted to be connected in parallel across the balancing coil. The third phase conductor is adapted to be connected to the center phase by way of a running capacitor. Starting circuitry which includes a starting capacitor as well as a control relay is included. The relatively few components allows the static phase converter to occupy a relatively small volume which makes it adaptable to being disposed within the housings of various appliances including refrigeration units.

BRIEF DESCRIPTION OF THE DRAWING

These and other objects of the present invention will be made apparent by the accompanying description and attached drawings, wherein.

DETAILED DESCRIPTION OF THE PREFERRED EMBODIMENT

Figure 1:
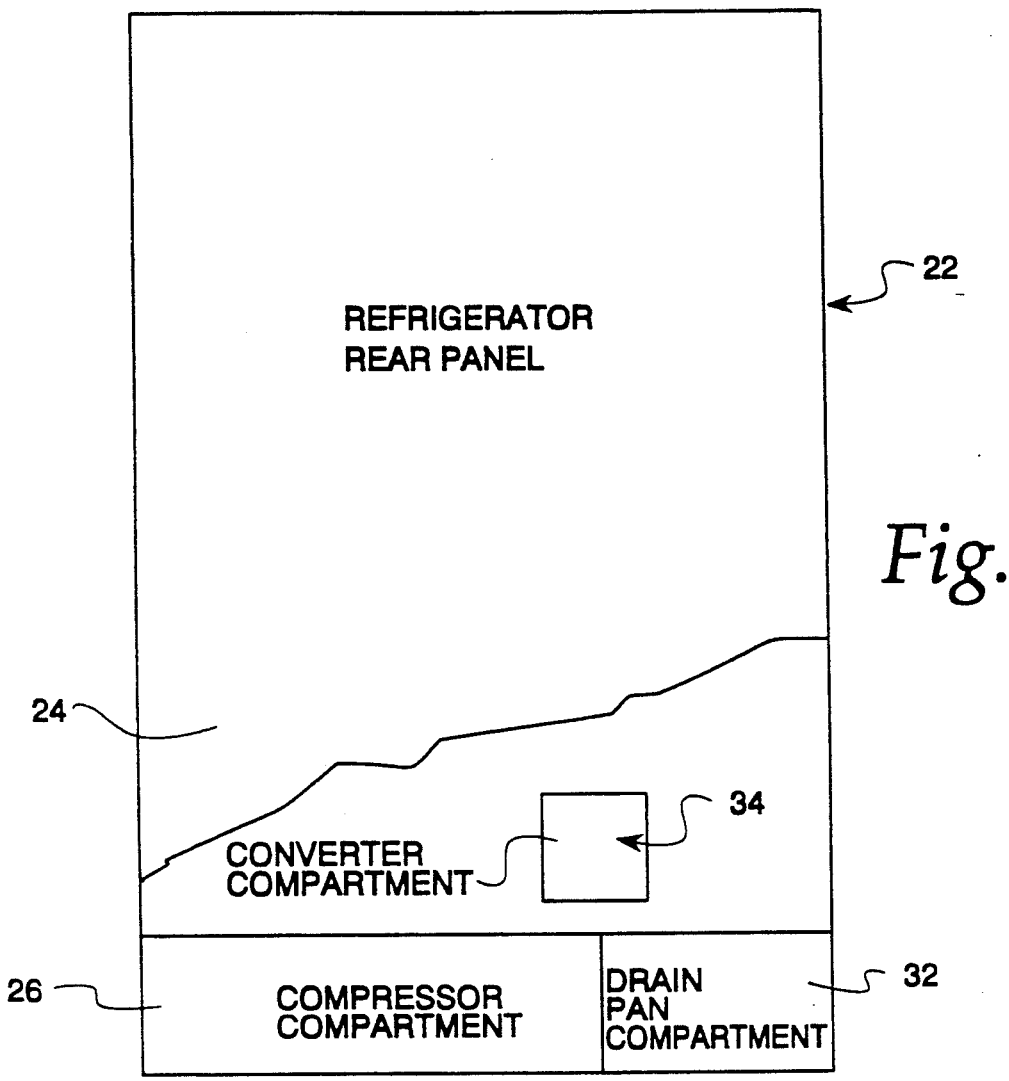
FIG. 1 is a rear view of a conventional refrigeration unit illustrating the volume required and the placement of the static phase converter in accordance with the present invention.

The static phase converter in accordance with the present invention is generally identified with the reference numeral 20. An important aspect of the invention relates to the relatively small volume it occupies which enables it to be disposed rather conveniently within various residential and commercial appliances such as refrigeration units and the like. More specifically, FIG.

1 illustrates a rear view of a typical refrigerator 22 illustrating a rear panel 24 partially broken away. A compressor compartment 26 is normally located in the lower portion of the refrigerator. A compressor motor (not shown) as well as condenser coils (not shown) are normally located in the compressor compartment 26. Disposed adjacent the compressor compartment 26 is a drain pan compartment 32.

The static phase converter 20 in accordance with the present invention is adapted to be disposed generally adjacent the compressor compartment 26 or adjacent the drain pan compartment 32. More specifically, since the static phase converter 20 occupies a relatively small volume, for example, 0.5 cubic feet or less, it is adapted to be disposed in a compartment 34 disposed adjacent the compressor compartment 26 or the drain compartment 32. Other than providing a support for carrying the static phase converter 20, little other modification would be required to incorporate the static phase converter 20 into an appliance such as a refrigerator and even a refrigerator for residential use. Moreover, in order to optimize other features of the refrigerator, such as drawer space, shelf space and the like, the refrigerator housings could easily be expanded an additional 0.5 cubic feet to allow for the static phase converter.

Figure 2:
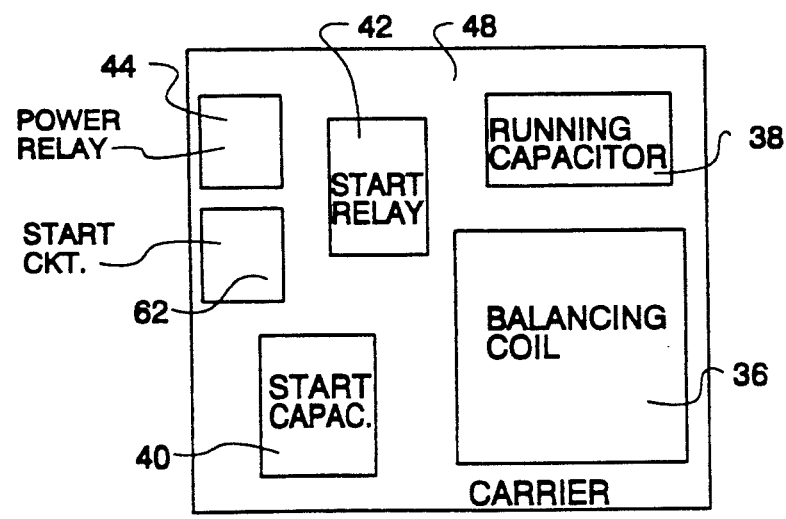
FIG. 2 is an exemplary component layout diagram for the components which form the static phase converter in accordance with the present invention.

The static phase converter 20 in accordance with the present invention includes a balancing coil 36, a running capacitor 38, a starting capacitor 40, a starting relay 42 and a power relay 44. These components 36, 38, 40, 42 and 44 may be mounted on a carrier 48 along with interconnecting wiring to form a modular unit as shown in FIG. 2 which occupies a relatively small volume, for example. 0.5 cubic feet to enable the unit to be installed into various appliances rather easily. More specifically, FIG. 2 illustrates an exemplary component layout diagram for the components which form the static phase converter 20 in accordance with the present invention. As will be clear to those of ordinary skill in the art, the components 36, 38, 40, 42 and 44, identified below, can readily be arranged in various ways to occupy a relatively small volume, for example, 0.5 cubic feet.

Figure 3:
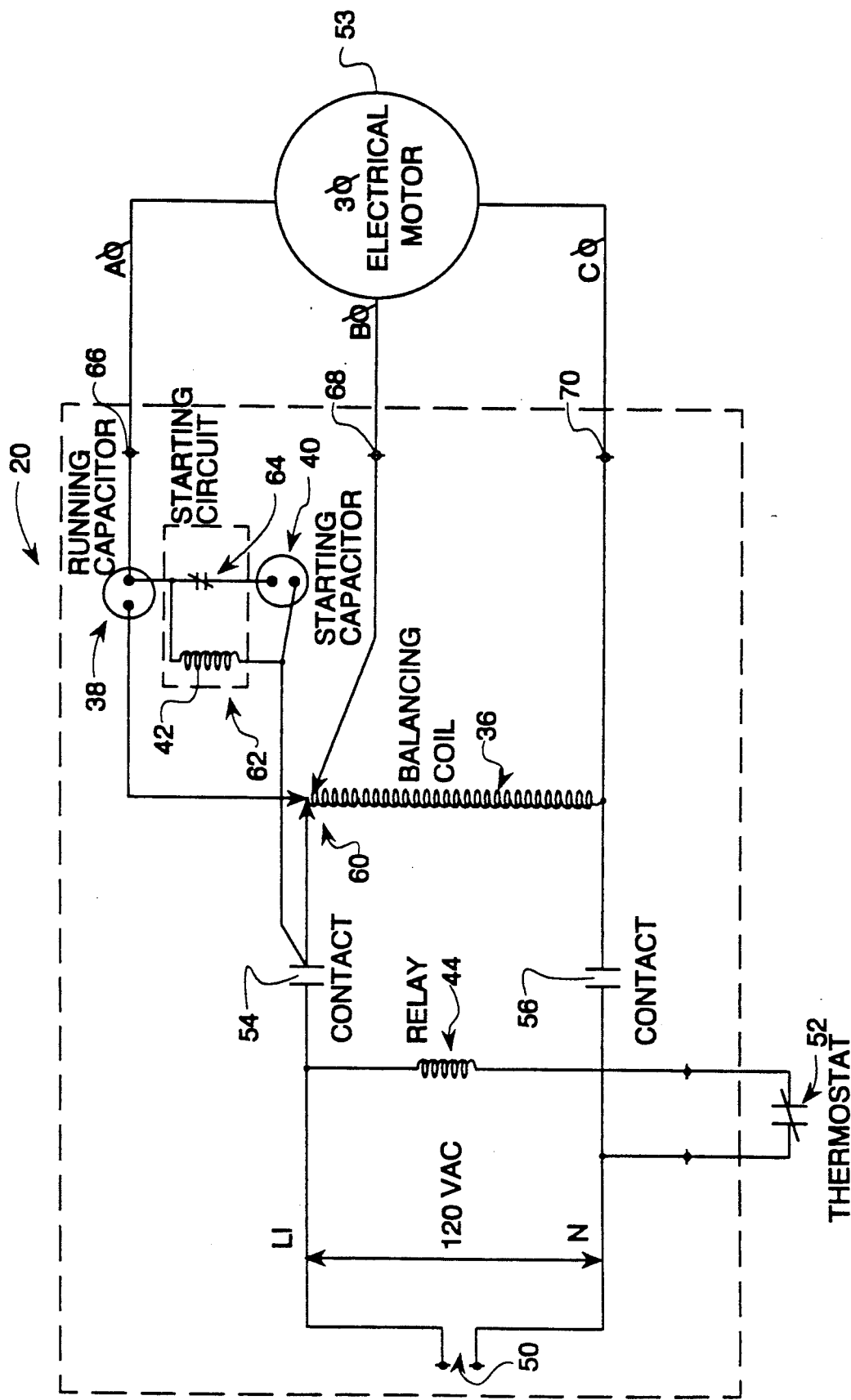
FIG. 3 is an electrical schematic diagram of the static phase converter in accordance with the present invention.

A schematic diagram for the static phase converter 20 in accordance with the present invention is illustrated in FIG. 3. The static phase converter 20 includes a pair of input terminals 50 adapted to be connected to a source of single phase 120 volts AC electrical power which includes a phase conductor L1 and a neutral conductor N. The input terminals 36 are adapted to be wired to a conventional electrical plug (not shown) to enable the refrigerator 22 or other appliance to be connected to a standard 120 volt AC wall socket. The power relay 44 is serially coupled to a refrigerator thermostat 52; the combination connected in parallel across the input terminals 50. The combination of the refrigerator thermostat 52 and the power relay 44 controls the switching of a 120 volt AC three phase compressor motor 53 during refrigeration cycles. More specifically, the refrigerator thermostat 52 is normally closed and opens when the desired cooling temperature is attained within the refrigerator 22. Thus, when the temperature within the refrigerator 22 is less than desired, the thermostat contact 52 will be closed which, in turn, energizes the power relay 44.

The power relay 44 is provided with at least two normally opened contacts 54 and 56. These contacts 54 and 56 are connected between the input terminals 50 and the rest of the circuit. Thus, during a cooling cycle, these contacts 54 and 56 will be closed which, in turn, applies 120 volts single phase source of electrical power to the balancing coil 36, connected in parallel across the input terminals 50 by way of the normally opened contacts 54 and 56. Two phases of the three phase compressor motor 53; for example, the B and C phases, are connected across the balancing coil 36. The A phase of the compressor motor 53 is connected to a junction 60 by way of a starting circuit 62 and the running capacitor 38. The junction 60 is formed by the connections of the B phase conductor of the compressor motor 53, the balancing coil 36 and the normally opened contact 54.

The starting circuit 62 includes a starting capacitor 40 and a starting relay 42 having a normally closed contact 64. As is known by those of ordinary skill in the art, the starting circuit 62 increases the starting torque of the compressor motor 53 to facilitate the compressor motor 53 getting up to a predetermined voltage, as sensed by the starting relay 42. During starting, the starting circuit 62 connects a starting capacitor 40 in parallel with the running capacitor 38. After the compressor motor 53 attains a predetermined voltage, the starting circuit 62 is disconnected by way of the contact 64 which is responsive to the starting relay 42.

Figure 4:
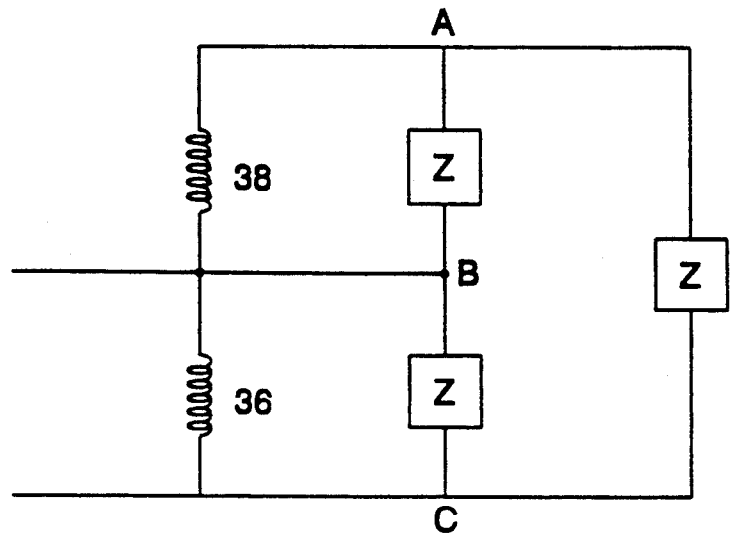
FIG. 4 is an impedance model of the circuit illustrated in 3.

The static phase converter 20 is able to provide a relatively balanced three phase source of electrical power at its output terminals 66, 68 and 70 from the single phase source as indicated. More specifically, FIG. 4 illustrates an impedance model of the circuit in FIG. 3, illustrating the per phase motor impedance as Z. By combining the motor impedances with the impedance for the running capacitor 38 and the balancing coil 36, the phase voltages can be calculated. More specifically, the combined impedance across the B and C phase is given by equation (1):

$$Z_1 = \frac{(Z)(j\omega L)}{Z + j\omega L} \quad (1)$$

where, jwL relates to the impedance of the balancing coil 36 in complex form, and Z relates to the per phase impedance of the motor 53.

The impedance $Z_2$, which is the parallel combination of the motor impedance with the running capacitor 38, is given by equation (2) below:

$$Z_2 = \frac{(Z)\left(-j\frac{1}{\omega c}\right)}{Z - j\frac{1}{\omega c}} \quad (2)$$

where, jwc relates to the impedance of the running capacitor 38 in complex form, and Z relates to the per phase impedance of the motor 53.

Figure 5:
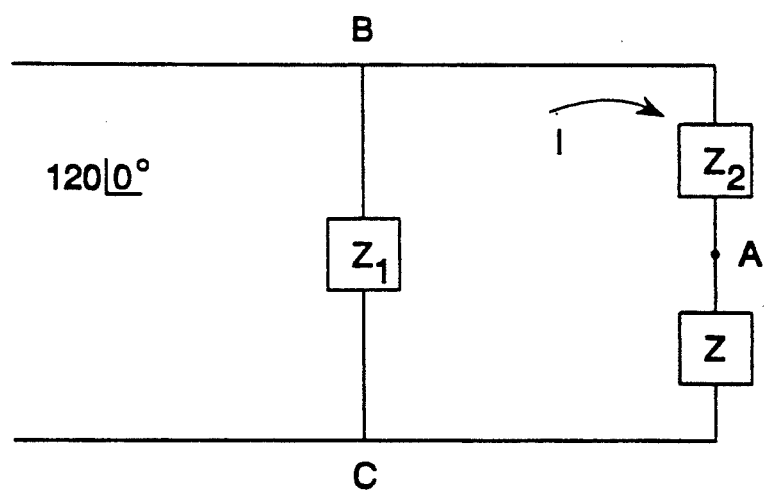
FIG. 5 is a simplified impedance model of the model in FIG. 4.

The phase voltage $V_{BC}$ is the single phase line voltage; 120 ∠0°. The model of FIG. 4 can thus be simplified as shown in FIG. 5 to derive phase voltages $V_{CA}$ and $V_{BC}$ using a simple voltage divider. More specifically, since $V_{CA} = -V_{AC}$, the phase voltage $V_{CA}$ is given by equation (3).

$$V_{CA} = -\frac{120 \angle 0°}{Z_2 + Z} \times Z \quad (3)$$

Moreover, since the phase voltage $V_{AB} = -V_{BA}$, the phase voltage $V_{AB}$ is given in equation (4).

$$V_{AB} = -\frac{120 \angle 0°}{Z_2 + Z} \times Z_2 \qquad (4)$$

By appropriately selecting the impedance values for the balancing coil 36, the running capacitor 38 as well as the motor impedance of the compressor motor 53, a relatively balanced source of three phase electrical power can be generated from a single phase electrical source. More specifically, the balancing coil 36 is formed from 351 turns of No. 15 AWG wire which is wound about a core formed from 29 AWG laminations as available from Laminations, Inc. under Model No. EI-175 of Chicago, Ill. The running capacitor 38 is provided with a value of 100 microfarads while the starting capacitor 40 is formed from two capacitors in parallel, each capacitor having a value between 270 and 324 microfarads.

The compressor motor 53 is formed as a three phase 120 volt 2 pole ½ horsepower motor. Such motors are not commonly available. However, the 120 volt compressor motor can relatively easily be formed from a 220 volt three phase motor by adjusting the number of turns of the motor windings per pole as well as adjusting the wire size of the motor windings. More specifically, a 220 volt three phase motor is usually formed on a No. 56 size frame with approximately 224 turns per pole per phase of 510 circular mil. wire. In order to form a 120 volt three phase motor, the same frame can be used and wound with wire which is approximately twice the size (e.g., 1022 circular mils.) and one-half of the number of turns (e.g., 336) per pole. Each pole winding is wound in the same pole slots as the 220 volt motor to form a 120 volt three phase motor which can be used for the compressor motor 53.

By utilizing relatively few components, the size of the static phase converter 20 as well as the weight is substantially smaller than known phase converters which utilize autotransformers which generally weigh approximately two times more. This aspect of the invention allows the static phase converter 20 to be rather easily and conveniently disposed within the housing of various appliances such as a refrigerator such as refrigerators and the like.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A static phase converter for converting a source of single phase electrical power to three phase electrical power, comprising:
    a pair of input terminals, adapted to be connected to a source of single phase electrical power;
    a set of three output terminals adapted to be connected to a predetermined three phase electrical load having a predetermined starting torque;
    a running capacitor having a first predetermined impedance, coupled between a balancing coil and one of said output terminals; and
    a balancing coil having a second predetermined impedance, connected between two of said output terminals, said first and second predetermined impedances selected to provide relatively balanced phase voltages and phase currents at said three output terminals.

2. The static phase converter recited in claim 1, further including means for increasing the starting torque applied to said electrical load.

3. The static phase converter recited in claim 2, wherein said increasing means includes a starting capacitor and means for connecting said starting capacitor in parallel with said running capacitor during predetermined conditions.

4. The static phase converter recited in claim 1, wherein said predetermined electrical load is an electrical motor having a predetermined voltage.

5. The static phase converter recited in claim 4, wherein said predetermined voltage is 120 $V_{AC}$.

6. The static phase converter recited in claim 1, further including means for switching said output means under predetermined conditions.

7. The static phase converter recited in claim 6, wherein said switching means includes a relay with a plurality of contacts.

8. The static phase converter recited in claim 7, wherein said contacts are connected between said input terminals and said balancing coil.

9. An appliance, such as a refrigerator, comprising:
    a housing;
    a three phase electrical motor disposed within said housing; and
    means for statically converting single phase electrical power to three phase electrical power which includes a set of three output terminals, adapted to be connected to said three phase electrical motor and a pair of input terminals adapted to be connected to a source of single phase electrical power, said converting means including a balancing coil and a capacitor coupled across said output terminals and having predetermined impedances selected to provide relatively balanced phase voltages and phase currents to said three phase electrical motor, wherein said converting means is disposed in a compartment having a predetermined volume within said housing.

10. The appliance recited in claim 9, further including means for switching converting means.

11. The appliance as recited in claim 10, wherein switching means includes a thermostat.

12. The appliance recited in claim 9, wherein said predetermined volume is equal to or less than 0.5 cubic feet.

13. The appliance recited in claim 9, wherein said converting means includes a balancing coil adapted to be connected across said source of input terminals and a capacitor connected between said balancing coil and one of said output terminals.

* * * * *

UNITED STATES PATENT AND TRADEMARK OFFICE
CERTIFICATE OF CORRECTION

PATENT NO. : 5,293,108
DATED : March 8, 1994
INVENTOR(S) : Spudich

It is certified that error appears in the above-indentified patent and that said Letters Patent is hereby corrected as shown below:

Column 1, line 22, change "." to --,--;

line 62, after "within" insert --an--.

Column 3, line 33, change "." to --,--;

Column 4, lines 48 and 51, change " $-j\frac{1}{wc}$ " to $-\frac{1}{jwc}$ --.

UNITED STATES PATENT AND TRADEMARK OFFICE
CERTIFICATE OF CORRECTION

PATENT NO. : 5,293,108
DATED : March 8, 1994
INVENTOR(S) : Spudich

It is certified that error appears in the above-indentified patent and that said Letters Patent is hereby corrected as shown below:

Column 5, line 28, change "224 turns per pole per phase" to --224 turns per phase (672 turns per pole)--.

line 44, delete "such as a refrigerator".

Signed and Sealed this

Twenty-seventh Day of September, 1994

BRUCE LEHMAN

Attest:

Attesting Officer

Commissioner of Patents and Trademarks